United States Patent
Kunimi et al.

(10) Patent No.: US 11,137,961 B2
(45) Date of Patent: Oct. 5, 2021

(54) IMAGE FORMING APPARATUS FOR PRINTING A DESIGNATED PART OF PRINT DATA IN A SPECIAL COLOR

(71) Applicant: Ricoh Company, Ltd., Tokyo (JP)

(72) Inventors: Keiji Kunimi, Kanagawa (JP); Masato Tanaka, Tokyo (JP); Hiroki Matsuura, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/549,102

(22) Filed: Aug. 23, 2019

(65) Prior Publication Data

US 2020/0081669 A1    Mar. 12, 2020

(30) Foreign Application Priority Data

Sep. 6, 2018    (JP) .............................. JP2018-167286

(51) Int. Cl.
*G06F 3/12*    (2006.01)

(52) U.S. Cl.
CPC .......... *G06F 3/1253* (2013.01); *G06F 3/1205* (2013.01); *G06F 3/1243* (2013.01)

(58) Field of Classification Search
None
See application file for complete search history.

(56) References Cited

U.S. PATENT DOCUMENTS

| | | | | |
|---|---|---|---|---|
| 6,943,915 B1* | 9/2005 | Teraue | .................. | H04N 1/6052 358/1.9 |
| 2002/0057833 A1* | 5/2002 | Gill | ....................... | G06T 11/001 382/162 |
| 2003/0053094 A1* | 3/2003 | Ohga | ................... | H04N 1/6011 358/1.9 |
| 2007/0285687 A1* | 12/2007 | Okuyama | .............. | G06K 15/02 358/1.9 |
| 2010/0302588 A1* | 12/2010 | Ohno | ................. | G03G 15/5025 358/1.15 |
| 2011/0058200 A1* | 3/2011 | Miyahara | ............... | H04N 1/603 358/1.9 |

(Continued)

FOREIGN PATENT DOCUMENTS

| | | |
|---|---|---|
| JP | 2004-151775 | 5/2004 |
| JP | 2007-148803 | 6/2007 |

(Continued)

OTHER PUBLICATIONS

Extended European Search Report dated Apr. 3, 2020, in Patent Application No. 19191962.0, citing document AA therein, 4 pages.

*Primary Examiner* — Barbara D Reinier

(74) *Attorney, Agent, or Firm* — Xsensus LLP

(57) ABSTRACT

A machine-readable, non-transitory recording medium, an image forming apparatus, and an information processing apparatus. The machine-readable, non-transitory recording medium stores instructions that, when executed, cause the information processing apparatus to display a special color settings screen for setting an RGB value of drawing data to be printed in a special color included in print data to be transmitted to an image forming apparatus, generate the print data instructing printing of the RGB value set on the special color settings screen in the special color, and transmit the generated print data to the image forming apparatus.

8 Claims, 10 Drawing Sheets

(56) References Cited

U.S. PATENT DOCUMENTS

| | | | |
|---|---|---|---|
| 2012/0269525 A1* | 10/2012 | Shindo | G06K 15/1809 399/39 |
| 2013/0077982 A1* | 3/2013 | Hasegawa | G03G 15/5062 399/15 |
| 2018/0239282 A1 | 8/2018 | Sakai | |

FOREIGN PATENT DOCUMENTS

| | | | |
|---|---|---|---|
| JP | 2008-090474 | | 4/2008 |
| JP | 2008-187304 | | 8/2008 |
| JP | 2009-075853 | | 4/2009 |
| JP | 2016103695 | * | 6/2016 |

* cited by examiner

```
@PJL SET IR_PRINT=ON
@PJL SET IR_COLOR_R = 255
@PJL SET IR_COLOR_G = 255
@PJL SET IR_COLOR_B = 0
@PJL SET IR_COLOR_MARGIN = 1
...
(PRINT DATA TO FOLLOW)
```

FIG. 11

```
1100
@PJL SET IR_TEXT=ON
@PJL SET IR_TEXT_COLOR_R = 255
@PJL SET IR_TEXT_COLOR_G = 255      } 1101
@PJL SET IR_TEXT_COLOR_B = 0
@PJL SET IR_GRAPHICS=ON
@PJL SET IR_GRAPHICS_COLOR_R = 0
@PJL SET IR_GRAPHICS_COLOR_G = 255  } 1102
@PJL SET IR_GRAPHICS_COLOR_B = 255
@PJL SET IR_IMAGE=OFF
@PJL SET IR_IMAGE_COLOR_R = 0
@PJL SET IR_IMAGE_COLOR_G = 0       } 1103
@PJL SET IR_IMAGE_COLOR_B = 0
...
(PRINT DATA TO FOLLOW)
```

IMAGE FORMING APPARATUS FOR PRINTING A DESIGNATED PART OF PRINT DATA IN A SPECIAL COLOR

CROSS-REFERENCE TO RELATED APPLICATIONS

This patent application is based on and claims priority pursuant to 35 U.S.C. § 119(a) to Japanese Patent Application No. 2018-167286, filed on Sep. 6, 2018 in the Japan Patent Office, the entire disclosure of which is hereby incorporated by reference herein.

BACKGROUND

Technical Field

The present disclosure relates to a machine-readable, non-transitory recording medium, an image forming apparatus, and an information processing apparatus.

Discussion of the Background Art

Various additional information, such as a still image, can be embedded in image data. An image processing apparatus may analyze the color of input image data, receive specification of the color of data to be hidden, and convert only the same data portion as a designated color into a transparent color.

SUMMARY

Embodiments of the present disclosure describe a machine-readable, non-transitory recording medium, an image forming apparatus, and an information processing apparatus. The machine-readable, non-transitory recording medium stores instructions that, when executed, cause the information processing apparatus to display a special color settings screen for setting an RGB value of drawing data to be printed in a special color included in print data to be transmitted to an image forming apparatus, generate the print data instructing printing of the RGB value set on the special color settings screen in the special color, and transmit the generated print data to the image forming apparatus.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 11 is a diagram illustrating an example of the special color settings information according to the third embodiment of the present disclosure;

Figure 1:
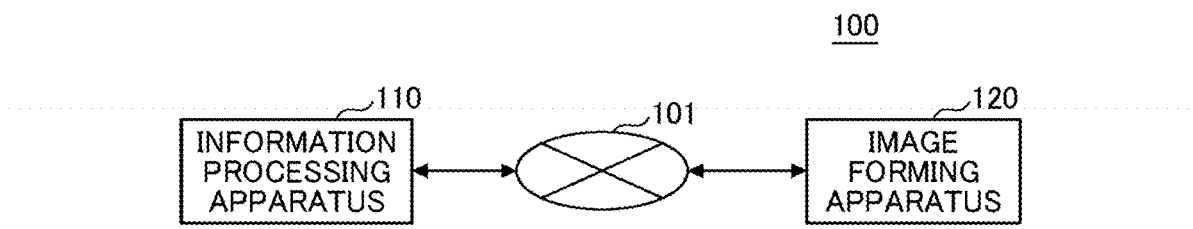
FIG. 1 is a diagram illustrating an example of a system configuration of an information processing system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Embodiments of the present disclosure are described below with reference to the attached drawings.

<System Configuration>

FIG. 1 is a diagram illustrating an example of a system configuration of an information processing system according to embodiments of the present disclosure. As illustrated in FIG. 1, the information processing system 100 includes, for example, an information processing apparatus 110 and an image forming apparatus 120 communicably connected through a network 101 such as the internet or a LAN (Local Area Network). Connection of the information processing apparatus 110 and the image forming apparatus 120 is not limited to the network 101, and may be communicably connected by, for example, a cable or near field communication.

Examples of the image forming apparatus 120 include an electronic apparatus having a print function such as a printer, or a multifunction peripheral (MFP) providing scan, copy, print, facsimile capabilities and the like in a single housing.

Further, the image forming apparatus 120 according to the present embodiment performs printing using a special color different from standard printing (hereinafter referred to as special color printing), in addition to standard color printing or standard monochrome printing (hereinafter, referred to as standard printing).

For example, in addition to color printing using color toner, the image forming apparatus 120 performs infrared (IR) toner printing in which an invisible pattern is printed with IR toner that is difficult to recognize by the naked eye, but which can be recognized using a special device such as an infrared camera.

IR toner printing is an example of invisible printing in which an invisible pattern that is difficult to recognize visually is printed. However, invisible printing is not limited to the use of IR toner, and, for example, printing may be performed using a special toner, ink or the like that becomes visible upon by irradiation with ultraviolet light or black light.

Furthermore, IR toner printing and invisible printing are examples of the special color printing. However, special color printing is not limited to IR toner printing or invisible printing, and thus, for example, printing may be performed using a special color such as fluorescent color, gold color, silver color, etc., that cannot be obtained with ordinary color toner. Here, as an example, the description below is given assuming that the special color printing is the IR toner printing using the IR toner.

As an example, the image forming apparatus 120 uses a printer capable of mounting four color toners of cyan (C) toner, magenta (M) toner, yellow (Y) toner, and key plate or black (K) toner. In this case, in place of the K toner of the image forming apparatus 120, a special color toner such as IR toner is installed for the special color printing, and the color printing is performed using the C toner, the M toner, and the Y toner. At this time, printing is performed using, for example, three color toners of C, M, and Y, for a black print portion to be originally printed with the K toner, since black can be expressed by using equal proportions of the C toner, the M toner, and the Y toner.

As another example, in addition to the four color toners of C, M, Y, and K, the image forming apparatus 120 may be capable of mounting the special color toner such as IR toner, for example.

The information processing apparatus 110 is a computer in which a printer driver, which is a program for controlling printing, is installed. For example, the information processing apparatus 110, by executing the printer driver, displays a special color settings screen for setting red, green and blue (RGB) value of drawing data to be printed in the special color such as IR toner, included in print data to be transmitted to the image forming apparatus 120. In addition, the information processing apparatus 110 includes in the print data, special color settings information instructing the special color printing of the RGB value set on the special color settings screen and transmits the print data to the image forming apparatus 120.

On the other hand, when the print data received from the information processing apparatus 110 includes the special color settings information that indicates RGB value to be printed in the special color, the image forming apparatus 120 prints the special color designated by the RGB value in the special color such as IR toner.

With the above configuration, the user can use the special color settings screen of the information processing apparatus 110 to set, for example, the RGB value of text and graphics to be printed with the special color toner such as the invisible toner.

Also, for example, in general-purpose applications such as word processing and spreadsheets, because the color of text, figures, etc., can be designated by the RGB value, the user can print out drawing data input with the designated RGB value in the special color such as IR toner.

As described above, according to the present embodiment, it is possible to designate and print the special color using a general-purpose application.

<Hardware Configuration>

(Hardware Configuration of Information Processing Apparatus)

Figure 2:
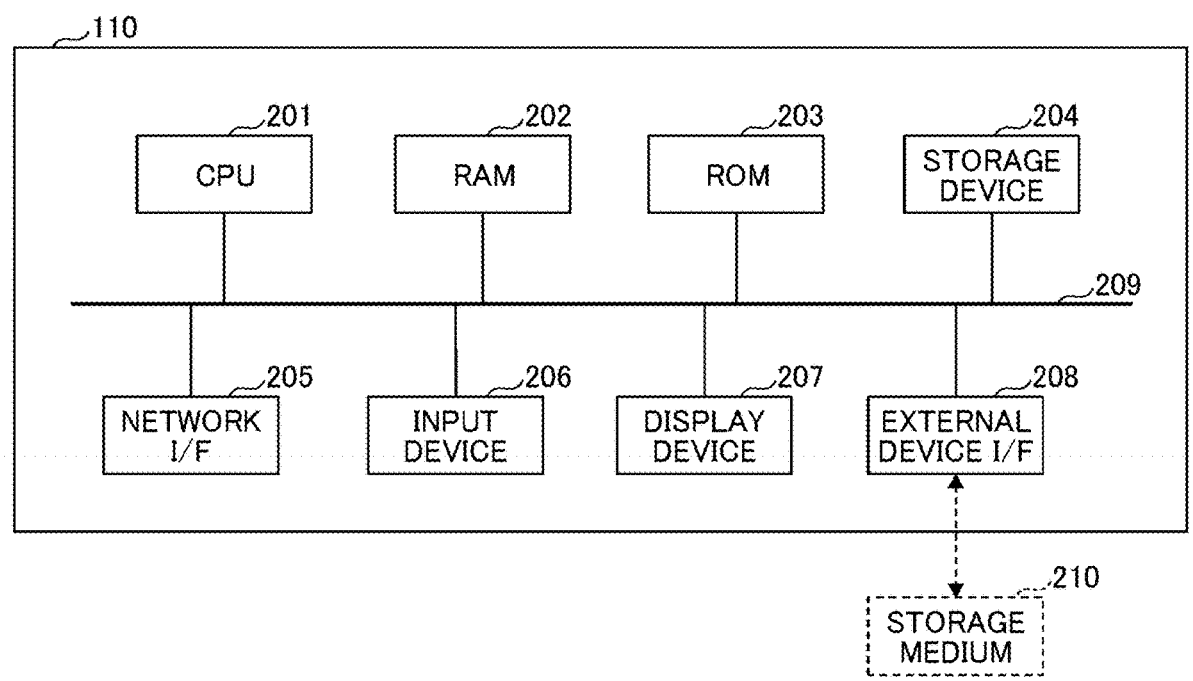
FIG. 2 is a diagram illustrating an example of a hardware configuration of an information processing apparatus according to embodiments of the present disclosure.

FIG. 2 is a diagram illustrating an example of a hardware configuration of an information processing apparatus according to the present embodiment. The information processing apparatus 110 includes, for example, a central processing unit (CPU) 201, a random access memory (RAM) 202, a read only memory (ROM) 203, a storage device 204, a network interface (I/F) 205, an input device 206, a display device 207, an external device I/F 208, a bus 209, and the like.

The CPU 201 is an arithmetic device that implements the functions of the information processing apparatus 110 by reading the programs and data stored in the ROM 203, the storage device 204, and the like onto the RAM 202 and executing processing. The RAM 202 is a volatile memory used as a work area or the like of the CPU 201. The ROM 203 is a nonvolatile memory capable of retaining programs and data even when the power is turned off.

The storage device 204 is, for example, a large-capacity storage device such as a hard disk drive (HDD) or a solid state drive (SSD), and stores an operating system (OS), applications, the printer driver, various data, and the like. The network I/F 205 is a communication interface for connecting the information processing apparatus 110 to the network 101 or the like.

The input device 206 is, for example, a pointing device such as a mouse, or an input device such as a keyboard, and is used to input operating signals to the information processing apparatus 110. The display device 207 is a display device such as a display for displaying the processing result, etc., of the information processing apparatus 110. The input device 206 and the display device 207 may be integrated into a single unit as a display input device, such as a touch panel display.

The external device I/F 208 is an interface for connecting an external device to the information processing apparatus 110. The external device may include, for example, a storage medium 210 and the like. The bus 209 is connected to each of the above-described components and transfers address signals, data signals, and various types of control signals.

(Hardware Configuration of Image Forming Apparatus)

Figure 3:
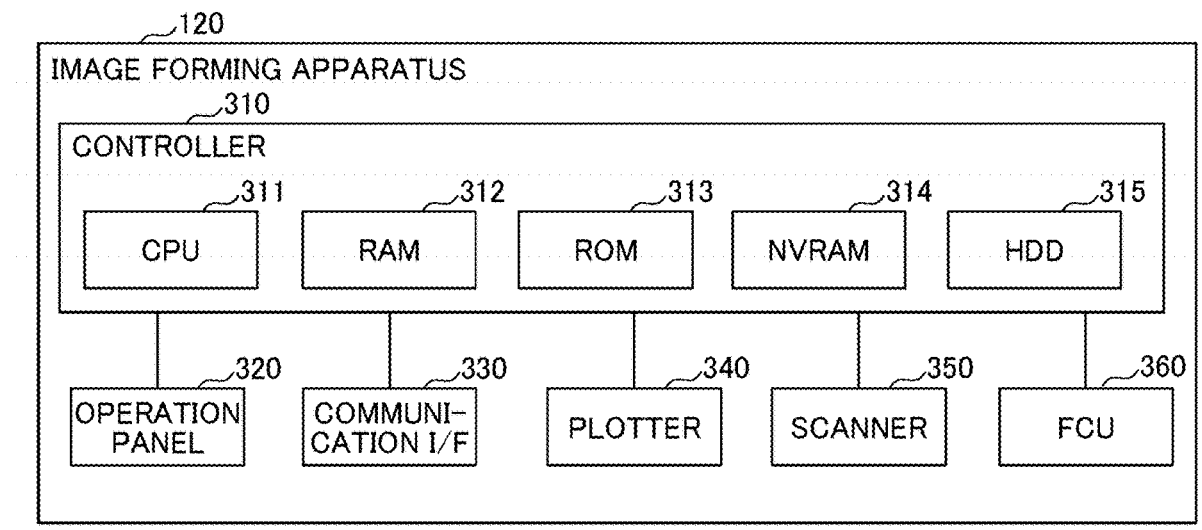
FIG. 3 is a diagram illustrating another example of a hardware configuration of an image forming apparatus according to embodiments of the present disclosure.

FIG. 3 is a diagram illustrating another example of a hardware configuration of an image forming apparatus according to the present embodiment. The image forming apparatus 120 includes, for example, a controller 310, an operation panel 320, a communication I/F 330, a plotter 340, a scanner 350, and a facsimile control unit (FCU) 360.

The controller 310 has a computer configuration and includes, for example, a CPU 311, a RAM 312, a ROM 313, a nonvolatile RAM (NVRAM) 314, an HDD 315, and the like.

The ROM 313 is a nonvolatile storage device that stores various programs and data. The RAM 312 is a volatile storage device that temporarily holds programs and data.

The NVRAM 314 is a writable nonvolatile storage device that stores settings information and the like, for example. The HDD 315 is a large capacity storage device that stores various programs and data.

The CPU 311 loads programs, data, or settings information from the storage device such as the ROM 313, the NVRAM 314 and the HDD 315 onto the RAM 312 and executes processing to implement entire control and functions of the image forming apparatus 120.

The operation panel 320 includes an input unit that receives a user input, and a display unit that displays various information. The communication I/F 330 is a communication interface for connecting the image forming apparatus 120 to the network 101.

The plotter 340 is a printer device that prints out print data. The scanner 350 is a reading device that reads an original or the like. The FCU 360 transmits and receives facsimile data.

<Functional Configuration>

Figure 4:
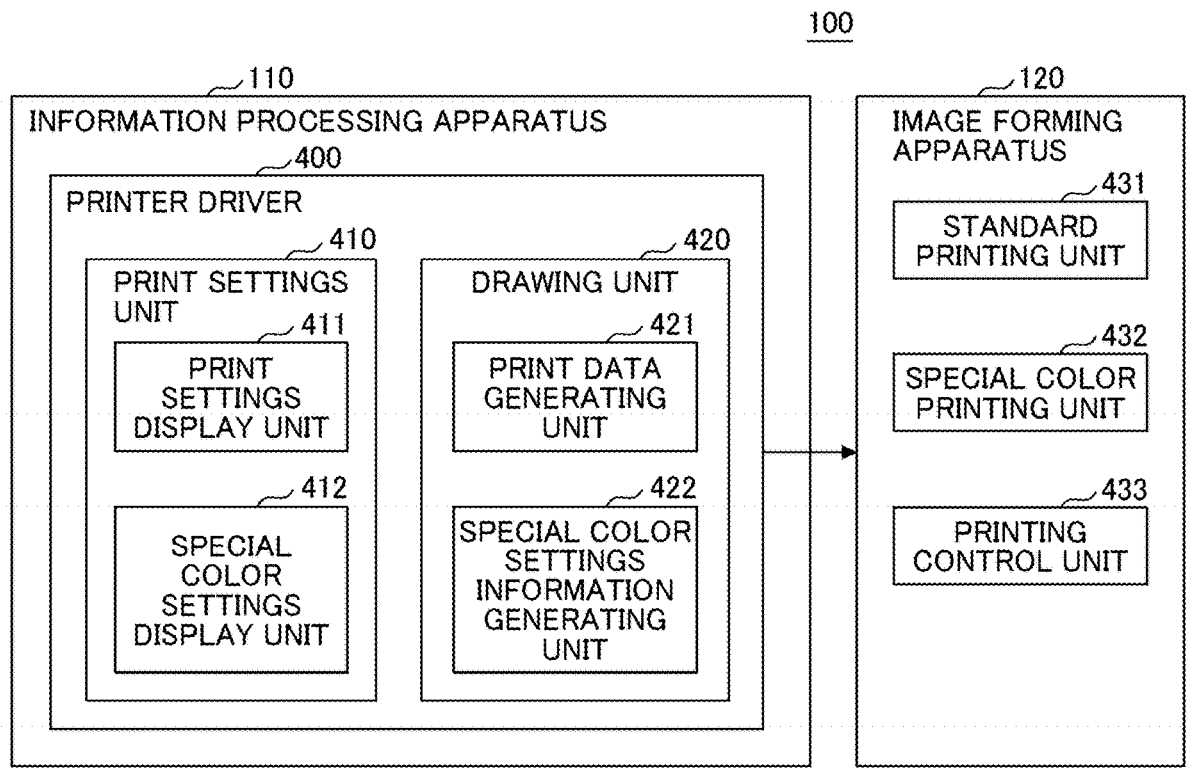
FIG. 4 is a diagram illustrating an example of a functional configuration of an information processing system according to embodiments of the present disclosure.

FIG. 4 is a diagram illustrating an example of a functional configuration of an information processing system according to the present embodiment.

(Functional Configuration of Information Processing Apparatus)

The information processing apparatus 110 implements a print settings unit 410 and a drawing unit 420 by executing the printer driver 400 using the CPU 201 illustrated in FIG. 2. The information processing apparatus 110 also executes other programs such as a general-purpose OS and an application, but the description of the functional configuration of the other programs is omitted here.

For example, when the user performs printing from an application, the print settings unit 410 displays a settings screen for performing various settings related to printing and receives a setting operation by the user. The print settings unit 410 includes, for example, a print settings display unit 411 and a special color settings display unit 412.

The print settings display unit 411 displays, for example, a print settings screen for setting general settings such as document size, document direction, color/monochrome, single-sided/double-sided, combined printing, and staple on the display device 207 illustrated in FIG. 2.

The special color settings display unit 412 displays the special color settings screen for setting the RGB value of drawing data such as text and graphics to be printed in the special color (such as IR toner) included in the print data to be transmitted to the image forming apparatus 120. The special color settings screen is described in detail in the first to third embodiments described below.

As an example, the print settings screen displayed by the print settings display unit 411 includes a button for opening the special color settings screen in addition to the items of the print settings screen displayed by a general-purpose printer driver. The user can cause the special color settings display unit 412 to display the special color settings screen by selecting the button or the like for opening the special color settings screen.

Also, as another example, the print settings screen displayed by the print settings display unit 411 and the special color settings screen displayed by the special color settings display unit 412 may be included in one print settings screen displayed by the print settings unit 410.

The drawing unit 420 generates print data supported by the image forming apparatus 120 based on data to be printed and transmits the generated print data to the image forming apparatus 120 using, for example, a function of the OS. The drawing unit 420 includes, for example, a print data generating unit 421 and a special color settings information generating unit 422.

The print data generating unit 421 converts the data to be printed into the print data supported by the image forming apparatus 120. Functions of the print data generating unit 421 may be the same as functions of the drawing unit of a general-purpose printer driver.

The special color settings information generating unit 422 generates special color settings information that instructs to print the RGB value set on the special color settings screen in the special color such as IR toner. The special color settings information is described in detail in the first to third embodiments described below.

With the above-described configuration, the print settings unit 410 of the printer driver 400 displays the special color settings screen in which drawing data to be printed in the special color such as IR toner is set by the RGB value included in the print data to be transmitted to the image forming apparatus 120 on the display device 207 of FIG. 2.

When the RGB value to be printed in the special color is set in the special color settings screen, the drawing unit 420 of the printer driver 400 transmits the print data to the image forming apparatus 120 including the special color settings information that instructs to print the set RGB value in the special color.

(Functional Configuration of Image Forming Apparatus)

The image forming apparatus 120 implements, for example, a standard printing unit 431, a special color printing unit 432, a printing control unit 433 and the like by executing a program by the CPU 311 in FIG. 3. Note that at least a part of the standard printing unit 431, the special color printing unit 432, and the printing control unit 433 may be implemented by hardware.

The standard printing unit 431 performs the standard printing such as the color printing and the monochrome printing using the plotter 340 of FIG. 3 according to control from the printing control unit 433. For example, when the image forming apparatus 120 can load four color toners of C, M, Y, and K, the standard printing unit 431 performs the color printing using three color toners of C, M, and Y or the monochrome printing.

In addition, when the image forming apparatus 120 can load the special color toner such as IR toner in addition to four color toners of C, M, Y, and K, the standard printing unit 431 performs the color printing or the monochrome printing using four color toners of C, M, Y, and K.

The special color printing unit 432 performs the special color printing in the special color such as IR toner using the plotter 340 of FIG. 3 according to the control from the printing control unit 433. For example, when the image forming apparatus 120 can load four color toners of C, M, Y, and K, the special color toner such as IR toner is installed instead of the K toner, and the special color printing unit 432 performs the special color printing using this special color toner.

In addition, when the image forming apparatus 120 can load the special color toner such as IR toner in addition to the toners of four colors of C, M, Y, and K, the special color printing unit 432 performs the special color printing using the special color toner.

The printing control unit 433 controls the standard printing by the standard printing unit 431 and the special color printing by the special color printing unit 432.

For example, when the print data received from the information processing apparatus 110 does not include the special color settings information indicating the RGB value to be printed in the special color, the printing control unit 433 sends the print data to the standard printing unit 431 to perform standard printing. Note that "when the print data does not include the special color settings information" also includes when the special color settings information included in the print data is set to off (disabled).

On the other hand, when the print data received from the information processing apparatus 110 includes the special color settings information, the printing control unit 433 causes the standard printing unit 431 to print drawing data other than the RGB value indicated by the special color settings information in the print data. Further, the printing control unit 433 causes the special color printing unit 432 to perform the special color printing of the drawing data of the RGB value designated by the special color settings information included in the print data. Note that "when the print data includes the special color settings information" does not include when the special color settings information included in the print data is set to off (disabled).

Preferably, if there is another color under the special color such as IR toner in the received print data, the printing control unit 433 enables overprinting to print another color under the special color. The overprint is described below.

<Color Settings in Application>

Settings of colors in a general-purpose application such as an office application are described hereinafter. In the general-purpose application such as a word processor, a spreadsheet, and a presentation, a color of a character or a figure can be set with the RGB value, for example, using a color settings screen 510 as illustrated in FIG. 5A.

Figure 5A:
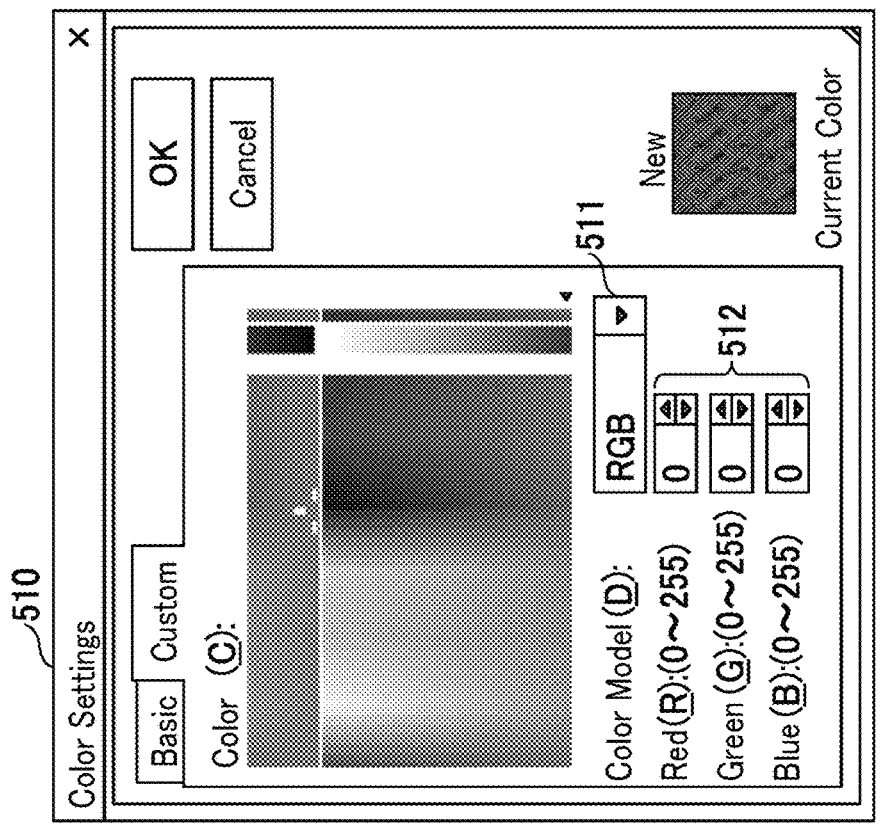
FIG. 5A and FIG. 5B are diagrams illustrating settings of color in a general-purpose application.

For example, on the color settings screen 510 illustrated in FIG. 5A, a user selects "RGB" using a color model pull-down menu 511 and sets values for red (R), green (G), and blue (B) using setting fields 512.

In the general-purpose application, the values for R, G, and B are set as numerical values of 0 to 255, respectively. A value of 0 to 255 expresses a numerical value that can be expressed as 8 bits of digital values in decimal notation and setting each color in 256 steps of 0 to 255 makes it possible to express $256^3$ colors (16,777,216 colors).

Figure 5B:
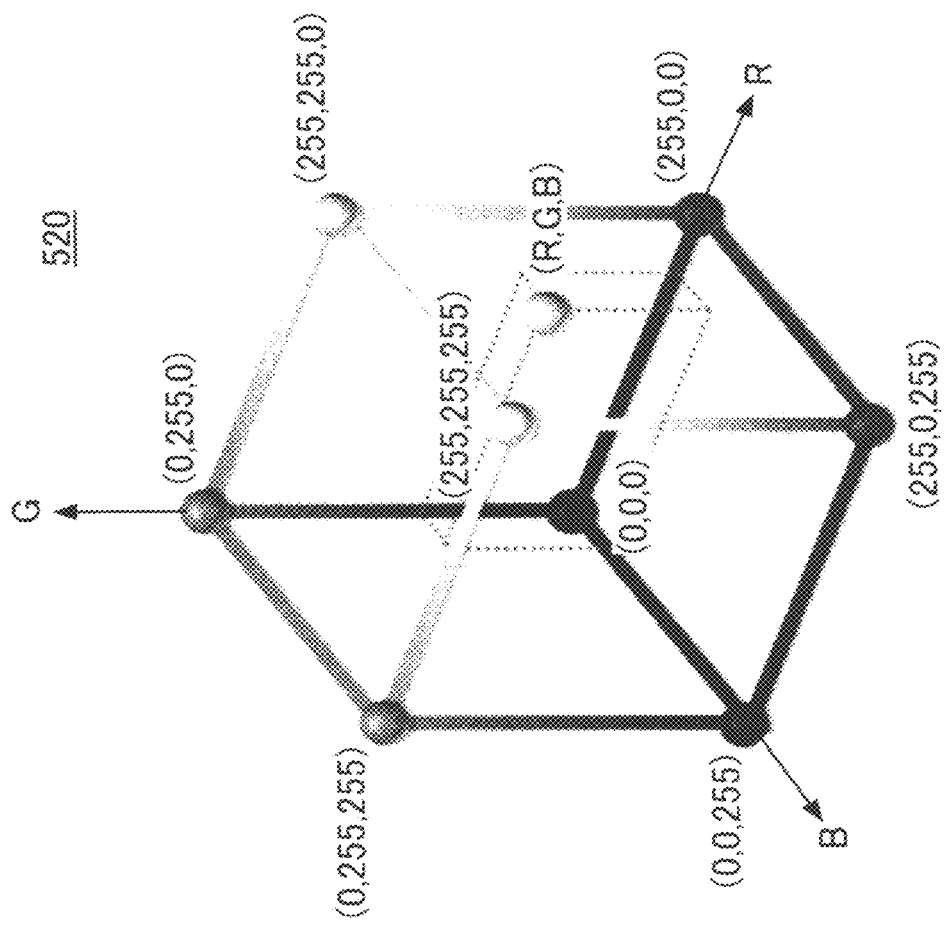

FIG. 5B illustrates RGB color space represented by the values for R, G, and B. In FIG. 5B, when each value of R, G and B is 0 (0, 0, 0), black is expressed. Also, when each value of R, G, B is 255 (255, 255, 255) white is expressed. Similarly, (0, 0, 255) expresses blue, (255, 0, 0) expresses red, and (0, 255, 0) expresses green. Thus, all the colors in the RGB color space illustrated in FIG. 5B can be expressed as a combination of R, G, and B values.

In the color settings screen 510 illustrated in FIG. 5A, for example, by selecting "HSL" using the color model pull-down menu 511, a color for character, figure and the like can be set in a hue, saturation, and lightness (HSL) color space. In the HSL color space, a color is expressed by values for hue (H), saturation (S), lightness (L), but according to a known formula, H, S, and L can be converted to R, G, and B in the RGB color space.

Also, depending on the application, the values for R, G, and B in the RGB color space may be set from 0% to 100%. In this case, setting values can be converted into the RGB value of 0 to 255 by setting 255 as 100%.

As described above, in the general-purpose application, it is possible to set the color within the range of the RGB color space, but when printing in the special color (for example, invisible toner, fluorescent color, etc.), a special application that supports special color printing in addition to printing using four color toners of C, M, Y, and K is necessary.

<Special Color Settings in Printer Driver>

The special color settings screen in the printer driver 400 and the special color settings information added to the print data are described below in the first to third embodiments.

First Embodiment

Figures 6, 7:
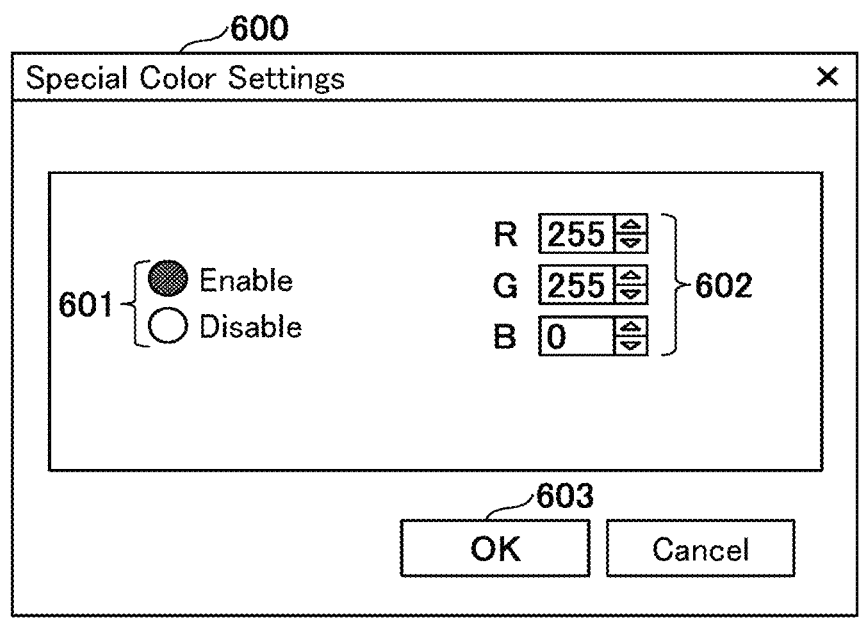
FIG. 6 is a diagram illustrating an example of a special color settings screen according to a first embodiment of the present disclosure.
FIG. 7 is a diagram illustrating an example of special color settings information according to the first embodiment of the present disclosure.

FIG. 6 is a diagram illustrating an example of the special color settings screen according to the first embodiment. FIG. 6 illustrates an example of the special color settings screen which the special color settings display unit 412 of the information processing apparatus 110 displays on the display device 207 and the like illustrated in FIG. 2.

For example, the user can enable the special color by selecting "enable" from either "enable" or "disable" of selection buttons 601 on the special color settings screen 600 as illustrated in FIG. 6.

For example, the user uses an application to create a character, a graphic, etc., to be printed in the special color such as IR toner by designating a certain RGB value, input the RGB value in the RGB value settings field 602 in the special color settings screen 600 and selects an "OK" button 603.

In response, the special color settings information generating unit 422 of the information processing apparatus 110 generates the special color settings information 701 as illustrated in FIG. 7, for example. The generated special color settings information 701 is added to the print data 700 generated by the print data generating unit 421 and transmitted to the image forming apparatus 120.

In the special color settings information 701 illustrated in FIG. 7, the description of "@PJL SET IR_PRINT=ON" indicates that the special color printing is to be performed.

In the special color settings information 701, the descriptions of "@PJL SET IR_COLOR_R=255", "@PJL SET IR_COLOR_G=255", and "@PJL SET IR_COLOR_B=0" indicate the RGB value of the drawing data to be printed in the special color.

For example, when the special color settings information 701 illustrated in FIG. 7 is included in the print data 700, the image forming apparatus 120 prints the RGB value of (255, 255, 0) among the drawing data included in the print data in the special color such as IR toner.

Second Embodiment

Figures 8, 9:
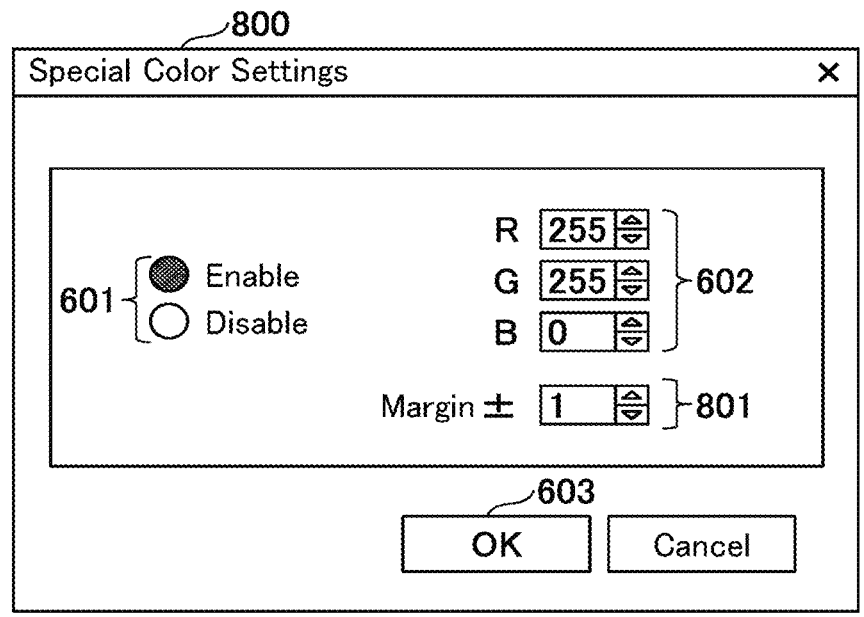
FIG. 8 is a diagram illustrating an example of the special color settings screen according to a second embodiment of the present disclosure.
FIG. 9 is a diagram illustrating an example of the special color settings information according to the second embodiment of the present disclosure.

FIG. 8 is a diagram illustrating an example of the special color settings screen according to a second embodiment. FIG. 8 illustrates another example of the special color settings screen that the special color settings display unit 412 of the information processing apparatus 110 causes the display device 207 or the like illustrated in FIG. 2 to display.

In the special color settings screen 800 illustrated in FIG. 8, a margin settings field 801 is added to the special color settings screen 600 illustrated in FIG. 6 according to the first embodiment. In the margin settings field 801, an allowable margin (range) of each value of R, G, and B set in the RGB value settings field 602 can be set. For example, if the RGB value set in the RGB value settings field 602 is (r, g, b) and the margin or range set in the margin settings field 801 is ±2, a color designated by the RGB value (r±2, g±2, b±2) is printed in the special color such as IR toner.

The user can set the special color, for example, by selecting "enable" from the selection buttons 601 on the special color settings screen 800 as illustrated in FIG. 8. In addition, the user uses an application to determine the RGB value to be printed in the special color such as IR toner, and inputs the determined RGB value into the RGB value settings field 602. Furthermore, the user sets the allowable margin (range) in the margin settings field 801 when setting the margin of the RGB value to be printed in the special color such as IR toner.

In response, the special color settings information generating unit 422 of the information processing apparatus 110 generates, for example, special color settings information 901 as illustrated in FIG. 9. The generated special color settings information 901 is added to the print data 900 generated by the print data generating unit 421 and transmitted to the image forming apparatus 120.

In the special color settings information 901 illustrated in FIG. 9, a description 902 of "@PJL SET IR_COLOR_MARGIN=1" is added to the special color settings information 701 illustrated in FIG. 7 according to the first embodiment. This description indicates that the allowable margin of the RGB value set in the margin settings field 801 is "±1".

For example, when the special color settings information 901 illustrated in FIG. 9 is included in the print data 700, the image forming apparatus 120 prints the RGB value of (255±1, 255±1, 0±1) among the drawing data included in the print data with the special color such as IR toner.

Third Embodiment

Figure 10:
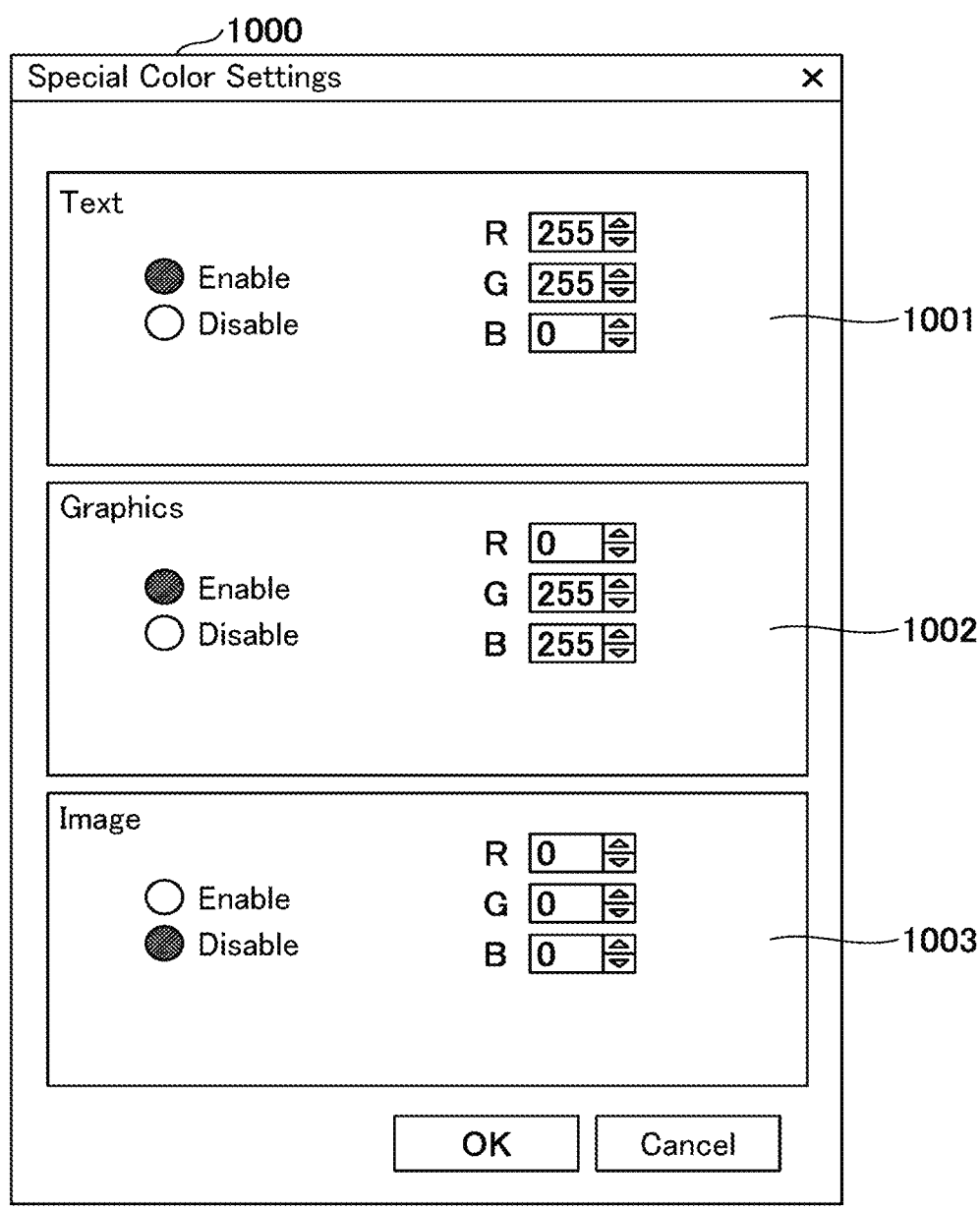
FIG. 10 is a diagram illustrating an example of the special color settings screen according to a third embodiment of the present disclosure.

FIG. 10 is a diagram illustrating an example of the special color settings screen according to a third embodiment. The special color settings screen illustrated in FIG. 10 is another example of the special color settings screen that the special color settings display unit 412 of the information processing apparatus 110 causes the display device 207 or the like illustrated in FIG. 2 to display.

In the special color settings screen 1000 illustrated in FIG. 10, for example, whether or not to set a special color and the RGB value to be printed in the special color such as IR toner for each attribute of drawing data, such as text, graphics, image (photographs), etc., can be set.

For example, in the text settings screen 1001, whether or not to set the special color for text, and the RGB value to be printed in the special color such as IR toner can be set. In the graphics settings screen 1002, whether or not to set the special color for graphic, and the RGB value to be printed in the special color such as IR toner can be set. In the image settings screen 1003, whether or not to set the special color for image, and the RGB value to be printed in the special color such as IR toner can be set.

In response, the special color settings information generating unit 422 of the information processing apparatus 110 generates the special color settings information 1101 to 1103 as illustrated in FIG. 11, for example. The generated special color settings information 1101 to 1103 is added to the print data 1100 generated by the print data generating unit 421 and transmitted to the image forming apparatus 120.

In the special color settings information 1101 illustrated in FIG. 11, settings made on the text settings screen 1001 illustrated in FIG. 10 are described. For example, the description of "@PJL SET IR_TEXT=ON" indicates that text data in the print data are to be printed in the special color. Further, the descriptions of "@PJL SET IR_TEXT_COLOR_R=255", "@PJL SET IR_TEXT_COLOR_G=255", and "@PJL SET IR_TEXT_COLOR_B=0" indicate the RGB value of text data to be printed in the special color.

Further, in the special color settings information 1102 illustrated in FIG. 11, settings made on the graphics settings screen 1002 illustrated in FIG. 10 are described. For example, the description of "@PJL SET IR_GRAPHICS=ON" indicates that graphics in the print data are to be printed in the special color. Further, the descriptions of "@PJL SET IR_GRAPHICS_COLOR_R=0", "@PJL SET IR_GRAPHICS_COLOR_G=255", and "@PJL SET IR_GRAPHICS_COLOR_B=255" indicate the RGB value of graphics to be printed in the special color.

Further, in the special color settings information 1103 illustrated in FIG. 11, settings made on the image settings screen 1003 illustrated in FIG. 10 are described. For example, the description of "@PJL SET IR_IMAGE=OFF" indicates that graphics in the print data is not to be printed in the special color.

For example, when the special color settings information 1101 to 1103 illustrated in FIG. 11 is added to the print data 1100, the image forming apparatus 120 prints an image such as a photo included in the print data by the standard printing. Further, the image forming apparatus 120 prints, among text data included in the print data, text data having an RGB value of (255, 255, 0) in the special color such as IR toner. Further, the image forming apparatus 120 prints graphic data having an RGB value of (0, 255, 255) among the graphic data included in the print data in the special color such as IR toner.

The special color settings screen 1000 according to the third embodiment illustrated in FIG. 10 may also include the margin settings field as described in the second embodiment.

Other Embodiments

The special color settings screens as illustrated in FIGS. 6 to 11 are examples, and various applications are possible.

For example, instead of the RGB value settings field 602, the special color settings screen may display colors such as black, cyan, magenta, yellow, red, green, blue, white, etc., and acquire an RGB value of a selected color. In this case, the special color settings information generating unit 422 generates the special color settings information as illustrated in FIGS. 7, 9, 11 and the like using the RGB value of the selected color. As a result, the image forming apparatus 120 can execute the same processing as in the first to third embodiments.

In addition, instead of the RGB value settings field 602, the special color settings screen may display an HSL settings field which inputs a value of HSL mentioned above and calculate an RGB value from the set HSL value.

The special color settings screen displayed by the special color settings display unit 412 may be of any input method or input format as long as the RGB value of drawing data to be printed in the special color such as IR toner can be set.

Furthermore, the special color settings screen may be designed to set the same value for R, G, and B (R=G=B) and an allowable margin for the set value. In this case, gray, white and black can be selectively printed in the special color such as IR toner.

<Information Processing>

Hereinafter, information processing in the information processing system 100 according to embodiments of the present disclosure is described.

(Processing of Information Processing Apparatus)

Figure 12:
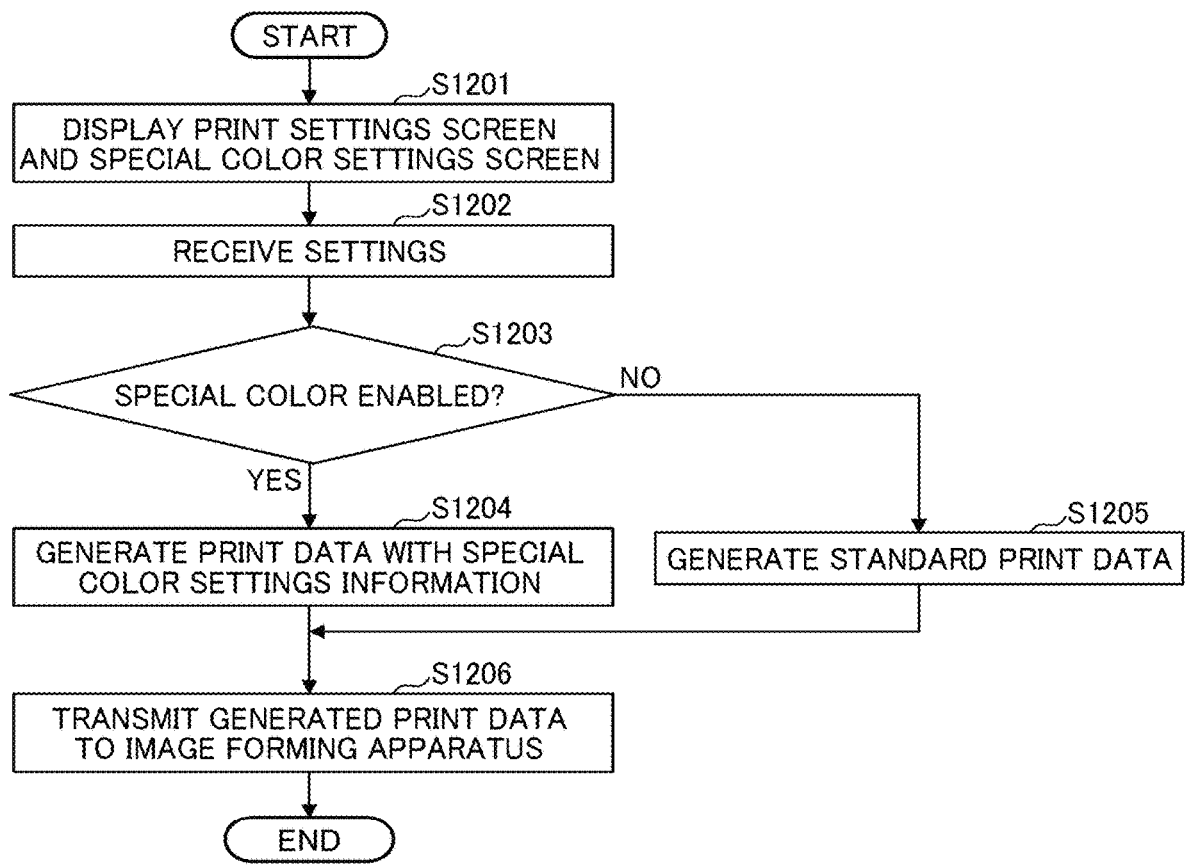
FIG. 12 is a flowchart illustrating an example of processing of the information processing apparatus according to embodiments of the present disclosure.

FIG. 12 is a flowchart illustrating an example of processing of the information processing apparatus according to embodiments of the present disclosure. FIG. 12 illustrates an example of a process executed by the printer driver 400 when, for example, a user prints data created by a general-purpose application.

Note that this process is common to the first to third embodiments, but the following description is made on the assumption that the special color settings screen is the same as the special color settings screen 600 in the first embodiment as illustrated in FIG. 6.

In step S1201, the print settings unit 410 of the printer driver 400 displays a standard print settings screen and, for example, the special color settings screen 600 as illustrated in FIG. 6 on the display device 207 of FIG. 2.

In step S1202, the print settings unit 410 receives a user's setting operation on the standard print settings screen and the special color settings screen 600.

In step S1203, the print settings unit 410 determines whether the setting of the special color is enabled on the special color settings screen 600. For example, when "enable" of the selection buttons 601 on the special color settings screen 600 illustrated in FIG. 6 is selected, the print settings unit 410 determines that the special color is enabled. Also, when "disable" is selected or when neither "enable" nor "disable" of the selection buttons 601 is not selected on the special color settings screen 600 illustrated in FIG. 6, the print settings unit 410 determines that the special color is disabled.

When the setting of the special color is enabled, the printer driver 400 causes the processing to proceed to step S1204. On the other hand, when the setting of the special color is disabled, the printer driver 400 causes the processing to proceed to step S1205.

In step S1204, the drawing unit 420 of the printer driver 400 generates print data instructing printing of the RGB value set on the special color settings screen 600 using the special color such as IR toner. For example, the special color settings information generating unit 422 generates the special color settings information 701 as illustrated in FIG. 7 using the RGB value set on the special color settings screen 600. The print data generating unit 421 generates the print data 700 by converting data to be printed into a format supported by the image forming apparatus 120 and adding the special color settings information 701 generated by the special color settings information generating unit 422.

On the other hand, when the process proceeds from step S1203 to step S1205, the drawing unit 420 of the printer driver 400 generates, for example, standard print data which does not include the special color settings information 701.

As another example, the drawing unit 420 of the printer driver 400 may generate print data with the special color settings information in which the value of "@PJL SET IR_PRINT" is set to OFF (disabled) in the special color settings information 701 as illustrated in FIG. 7.

In step S1206, the drawing unit 420 of the printer driver 400 transmits the generated print data to the image forming apparatus 120 using a function of the OS (for example, a spooler or the like).

(Processing Executed by Image Forming Apparatus)

Figure 13:
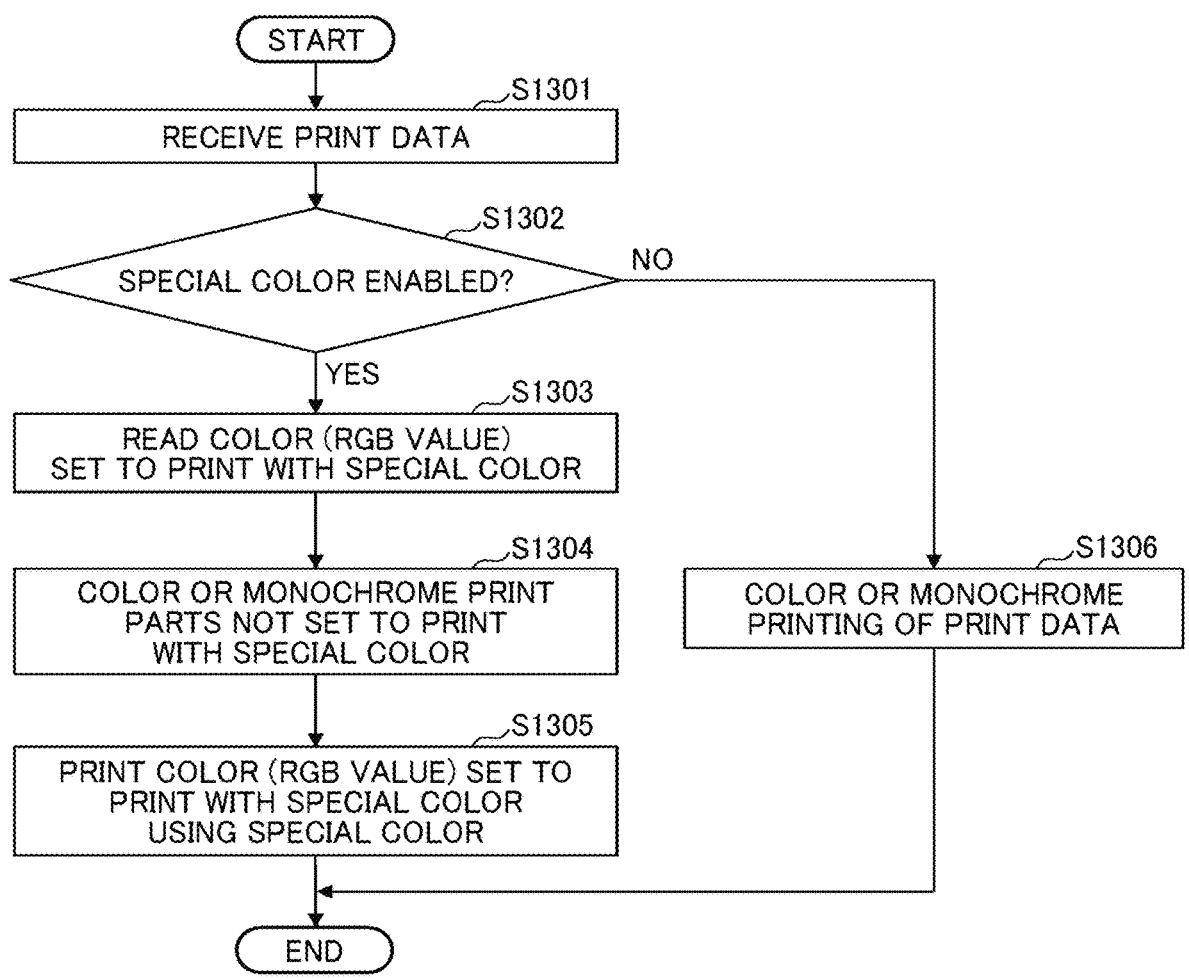
FIG. 13 is a flowchart illustrating an example of processing of the image forming apparatus according to embodiments of the present disclosure.

FIG. 13 is a flowchart illustrating an example of processing executed by the image forming apparatus according to embodiments of the present disclosure. FIG. 13 illustrates an example of the process executed when the image forming apparatus 120 receives the print data transmitted in step S1206 of FIG. 12.

In step S1301, the image forming apparatus 120 receives the print data transmitted from the information processing apparatus 110.

In step S1302, the printing control unit 433 of the image forming apparatus 120 determines whether the setting of the special color is enabled in the received print data. For example, as illustrated in FIG. 7, printing control unit 433 determines that the special color is set when the print data 700 includes the special color settings information 701, and when the value of "@PJL SET IR_PRINT" is set to ON (enabled).

On the other hand, the printing control unit 433 determines that the special color is off (disabled) when the received print data does not include the special color settings information 701, and when the value of "@PJL SET IR_PRINT" is set to OFF (disabled) in the special color settings information 701.

When the setting of the special color is on (enabled), the printing control unit 433 causes the processing to proceed to step S1303. On the other hand, when the setting of the special color is off (disabled), the printing control unit 433 causes the processing to proceed to step S1306.

In step S1303, the printing control unit 433 of the image forming apparatus 120 reads the color (RGB value) to be printed in the special color such as IR toner, for example, from the special color settings information 701 as illustrated in FIG. 7. In the example of FIG. 7, an RGB value (255, 255, 0) is read as the RGB value to be printed in the special color such as IR toner.

In step S1304, the printing control unit 433 of the image forming apparatus 120 controls the standard printing unit 431 to perform standard printing (color printing or monochrome printing), for example, using C, M, and Y toners for parts other than the color (RGB value) set to be printed with the special color.

When there is another color under the special color in the received print data, preferably, the printing control unit 433 performs overprinting, which is printing another color under the special color.

Figure 14A:
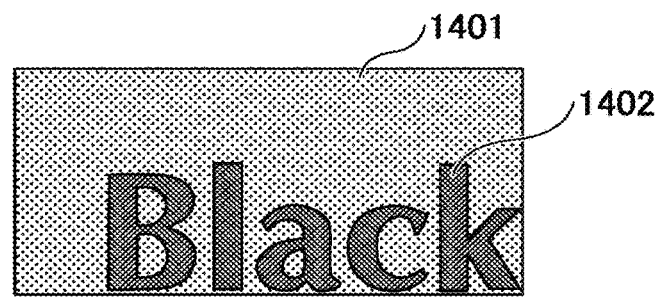
FIG. 14A, FIG. 14B, and FIG. 14C are diagrams illustrating an overprint according to embodiments of the present disclosure.
Figure 14B:
Figure 14C:

FIG. 14A, FIG. 14B, and FIG. 14C are diagrams illustrating overprinting according to embodiments of the present disclosure. In an example illustrated in FIG. 14A, it is assumed that the black characters 1402 are printed on an area 1401 filled with a background color.

When the overprint is not performed, printing of the background color is not performed on a portion 1403 below the characters 1402 in the area 1401, as illustrated in FIG. 14B. On the other hand, when the overprint is performed, the background color is also printed on the portion below the characters 1402 in the area 1401, as illustrated in FIG. 14C.

Therefore, for example, when printing characters 1402 using the IR toner and if the overprint is not performed, a color of paper (for example, white) in the portion of characters 1402 in the area 1401 is visible, as illustrated in FIG. 14B. Therefore, in the present embodiment, the overprint is enabled and the portion other than the special color such as IR toner is printed as the standard printing. As a result, even if special color printing is performed using the IR toner, expected print result can be obtained since the background color is also printed, for example, on the portion of the character 1402 in the area 1401 as illustrated in FIG. 14B.

Referring again to FIG. 13, the description of the flowchart is continued.

In step S1305, the printing control unit 433 of the image forming apparatus 120 controls the special color printing unit 432 to print the color (RGB value) set to the special color in the special color such as IR toner. The process of step S1305 may be performed in parallel with the process of step S1304.

On the other hand, when the process proceeds from step S1302 to step S1306, the printing control unit 433 of the image forming apparatus 120 performs the standard printing (color printing or monochrome printing) using, for example, C, M, and Y toners.

By the above process, the user can print, for example, drawing data (characters, figures, etc.) corresponding to the RGB value set on the special color settings screen 600 illustrated in FIG. 6 in the special color such as IR toner.

Note that, for example, when the margin is set on the special color settings screen 800 illustrated in FIG. 8, the printing control unit 433 causes the standard printing unit 431 to print a portion other than the margin from the set RGB value in step S1304 of FIG. 13. Also, in step S1305 of FIG. 13, the printing control unit 433 causes the special color printing unit 432 to print the portion within the margin of the set RGB value in the special color such as IR toner.

Further, for example, it is assumed that the RGB value of text data to be printed in the special color and the RGB value of graphic data to be printed in the special color are designated on the special color settings screen 800 illustrated in FIG. 10. In this case, in step S1304 of FIG. 13, the printing control unit 433 causes the standard printing unit 431 to print the portion other than the text of the designated RGB value and the graphic of the designated RGB value. Also, in step S1305 in FIG. 13, the printing control unit 433 causes the special color printing unit 432 to print the text of the designated RGB value and the graphic of the designated RGB value in the special color such as IR toner.

As described above, according to the embodiments of the present disclosure, it is possible to designate and print with a special color using a general-purpose application.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A machine-readable, non-transitory recording medium storing instructions which, when executed by one or more processors, cause the one or more processors to perform a method comprising:
   displaying a special color settings screen displaying, for each attribute of a plurality of attributes of drawing data to be printed, including text data, graphics data, and image data, a settable switch to enable/disable use of a special color for the attribute, and displaying screen elements to set, when enabling use of the special color for a particular attribute of the plurality of attributes, a particular RGB value such that all parts of the drawing data having the particular attribute and having the set particular RGB value are to be printed in a special color, the drawing data being included in print data to be transmitted to an image forming apparatus;
   generating, based on a setting received via the displayed special color setting screen, special color setting information, and adding the special color setting information to the print data; and
   transmitting the print data, including the special color setting information indicating the particular RGB value, to the image forming apparatus, which prints all the parts of the drawing data having the particular attribute and having the particular RGB value in the special color.

2. The machine-readable, non-transitory recording medium of claim 1, wherein the special color settings screen allows setting of a margin value applied to each component of the RGB value of the drawing data to be printed in the special color such that all the parts of the drawing data that are within plus or minus the margin value from each component of the RGB value are to be printed in the special color.

3. The information processing apparatus of claim 1, wherein the circuitry is further configured to display the special color screen, which includes three of the settable switches, one for each of the text data, the graphics data, and the image data, and the screen elements for each of the text data, the graphics data, and the image data.

4. An image forming apparatus, comprising:
   circuitry configured to:
   perform standard color printing and standard monochrome printing;
   perform special color printing that prints a special color different from the standard color printing and the standard monochrome printing;
   receive print data, including special color setting information indicating, for each attribute of the print data including text data, graphics data, and image data, a combination of a flag indicating whether the special color printing is enabled or disabled for the attribute, and a particular RGB value that should be printed in the special color;
   when a part of the print data having a particular attribute for which the special color printing is enabled has an RGB value other than the particular RGB value, print a color designated by the RGB value using standard color printing or standard monochrome printing; and
   when the part of the print data having the particular attribute has the particular RGB value, print a color designated by the particular RGB value in the special color, such that only those parts of the print data having the particular attribute and having an RGB value equal to the particular RGB value are printed in the special color.

5. The image forming apparatus of claim 4, wherein the special color printing is invisible printing.

6. The image forming apparatus of claim 4, wherein the special color printing includes IR toner printing that can be recognized using infrared light.

7. The image forming apparatus of claim 4, wherein, when there is another color under the special color in the print data, the circuitry is further configured to perform an overprint to print the another color under the special color.

8. An information processing apparatus, communicably connected to an image forming apparatus configured to print a special color different from standard color printing and standard monochrome printing, the information processing apparatus comprising:
   circuitry configured to
   display a special color settings screen displaying, for each attribute of a plurality of attributes of drawing data to be printed, including text data, graphics data, and image data, a settable switch to enable/disable use of a special color for the attribute, and displaying screen elements to set, when enabling use of the special color for a particular attribute of the plurality of attributes, a particular RGB value such that all parts of the drawing data having the particular attribute and having the set particular RGB value are to be printed in the special color, the drawing data being included in print data to be transmitted to an image forming apparatus;

generate, based on a setting received via the displayed special color setting screen, special color setting information, and adding the special color setting information to the print data; and transmit the print data, including the special color setting information indicating the particular RGB value, to the image forming apparatus, which prints all the parts of the drawing data having the particular attribute and having the particular RGB value in the special color.

\* \* \* \* \*